(12) United States Patent
Swain et al.

(10) Patent No.: US 11,897,788 B2
(45) Date of Patent: Feb. 13, 2024

(54) FILTER SYSTEM WITH ENHANCED DISPLAY

(71) Applicant: Paragon Water Systems, Inc., Tampa, FL (US)

(72) Inventors: David Swain, Palm Harbor, FL (US); Harkirat Sahni, Tampa, FL (US)

(73) Assignee: Paragon Water Systems, Inc., Tampa, FL (US)

( * ) Notice: Subject to any disclaimer, the term of this patent is extended or adjusted under 35 U.S.C. 154(b) by 0 days.

(21) Appl. No.: 17/450,070

(22) Filed: Oct. 5, 2021

(65) Prior Publication Data

US 2023/0107189 A1    Apr. 6, 2023

(51) Int. Cl.
  *C02F 1/28*    (2023.01)
  *C02F 1/00*    (2023.01)
  *C02F 1/68*    (2023.01)
(52) U.S. Cl.
  CPC .............. *C02F 1/283* (2013.01); *C02F 1/003* (2013.01); *C02F 1/687* (2013.01); *C02F 2201/003* (2013.01); *C02F 2201/006* (2013.01); *C02F 2307/06* (2013.01)
(58) Field of Classification Search
  None
  See application file for complete search history.

(56) References Cited

U.S. PATENT DOCUMENTS

| | | | |
|---|---|---|---|
| 4,693,820 A | 9/1987 | Baxter | |
| 5,277,802 A | 1/1994 | Goodwin | |
| 5,843,309 A | 12/1998 | Mancil | |
| 6,001,249 A | 12/1999 | Bailey et al. | |
| 6,099,735 A | 8/2000 | Kelada | |
| 6,149,780 A | 11/2000 | Miyake | |
| 7,014,782 B2 | 3/2006 | D'Emidio et al. | |
| 8,308,942 B2 | 11/2012 | Swain | |
| 2006/0065607 A1 | 3/2006 | Bassett et al. | |
| 2008/0020096 A1 | 1/2008 | Blum et al. | |
| 2008/0272054 A1 | 11/2008 | Schlegel et al. | |
| 2010/0006508 A1 | 1/2010 | Mitchell et al. | |
| 2011/0278207 A1* | 11/2011 | Swain | C02F 1/003 210/91 |
| 2021/0236991 A1* | 8/2021 | Schneidewend | C02F 1/441 |

* cited by examiner

*Primary Examiner* — Magali P Slawski
*Assistant Examiner* — Bernadette Karen McGann
(74) *Attorney, Agent, or Firm* — Greer, Burns & Crain, Ltd.

(57) ABSTRACT

A water filter system that includes a base that receives water from a faucet, where the base includes a bottom support and a vertical support transversely extending from the bottom support. The vertical support includes a visual light display having visual indicators that indicate different parameters of the filter system. A filter cartridge is seated in the base, and defines a first chamber having at least one filter element, and a second chamber in fluid communication with the first chamber. An enhancement cartridge is removably inserted in the second chamber of the filter cartridge and includes an enhancement material for adding minerals to the water. A cover having an opening is configured to slidingly engage the vertical support of the base so that the visual light display is positioned within the opening of the cover and visible to a user.

11 Claims, 14 Drawing Sheets

FILTER SYSTEM WITH ENHANCED DISPLAY

BACKGROUND

The present invention relates generally to water treatment devices, and more particularly to countertop residential filtration units connected to existing faucets.

To improve odor, taste and/or remove contaminants from already potable drinking water provided to residential users, many people install supplemental water filtration systems. Conventional residential water treatment systems are typically classified as whole house, under the counter mount, faucet mount and countertop mounted units. Most faucet mounted and countertop filter systems allow users to switch between filtered water for drinking and unfiltered water for washing dishes and other household activities where filtered water is not needed.

Conventional residential water filter systems typically include filter units that become filled with impurities over time and therefore need to be replaced periodically. Some of these systems also include an enhancement material which includes minerals that are added to the filtered water. An important design criteria for such filter units is the efficient utilization of filter cartridges and enhancement materials.

SUMMARY

A filter system is provided including a filter cartridge and an enhancement cartridge removably inserted in the filter cartridge. By making the enhancement cartridge independently removable from the filter cartridge, only one of the cartridges needs to be replaced at a time, thereby reducing waste of the filtering materials and costs associated with such systems.

More specifically, a water filter system is provided that includes a base configured for receiving water from a faucet and a filter cartridge seated in the base. The filter cartridge defines a first chamber having at least one filter element, and a second chamber in fluid communication with the first chamber. An enhancement cartridge is removably inserted in the second chamber and includes an enhancement material for adding minerals to the water. The enhancement cartridge is removable from the system separate from the filter cartridge.

In another embodiment, a water filter system is provided that includes a base including a bottom support and a vertical support transversely extending from the bottom support. The bottom support includes an incoming water port for receiving unfiltered water and an outgoing water port for receiving filtered water. A filter cartridge is seated in the base adjacent to the vertical support and includes at least one filter element for removing impurities from the water. The filter cartridge includes a water inlet and a water outlet where the water inlet and the water outlet are respectively in fluid communication with the incoming water port and the outgoing water port. An enhancement cartridge is removably located in and in fluid communication with the filter cartridge and includes an enhancement material for adding minerals to the filtered water. A cover is configured to enclose the filter cartridge and the vertical support and engage the bottom support.

In a further embodiment, a water filter system is provided that includes a base configured for receiving water from a faucet and a filter cartridge seated in the base, the filter cartridge defining a first chamber having at least one filter element, and a second chamber in fluid communication with the first chamber. An enhancement cartridge is removably inserted in the filter cartridge and includes a housing and a handle member removably connected to the housing, where the housing includes an enhancement material for adding minerals to the water and where the enhancement cartridge is independently removable from the filter cartridge. In situations where no minerals are to be added to the water, the enhancement cartridge is removed from the filter cartridge and the handle member is removed from the housing and re-inserted in the filter cartridge.

In another embodiment, a water filter system is provided and includes a base that receives water from a faucet, where the base includes a bottom support and a vertical support transversely extending from the bottom support. The vertical support includes a visual light display having visual indicators that indicate different parameters of the filter system. A filter cartridge is seated in the base, and defines a first chamber having at least one filter element, and a second chamber in fluid communication with the first chamber. An enhancement cartridge is removably inserted in the second chamber of the filter cartridge and includes an enhancement material for adding minerals to the water. A cover having an opening is configured to slidingly engage the vertical support of the base so that the visual light display is positioned within the opening of the cover and visible to a user.

DETAILED DESCRIPTION

Figure 1:
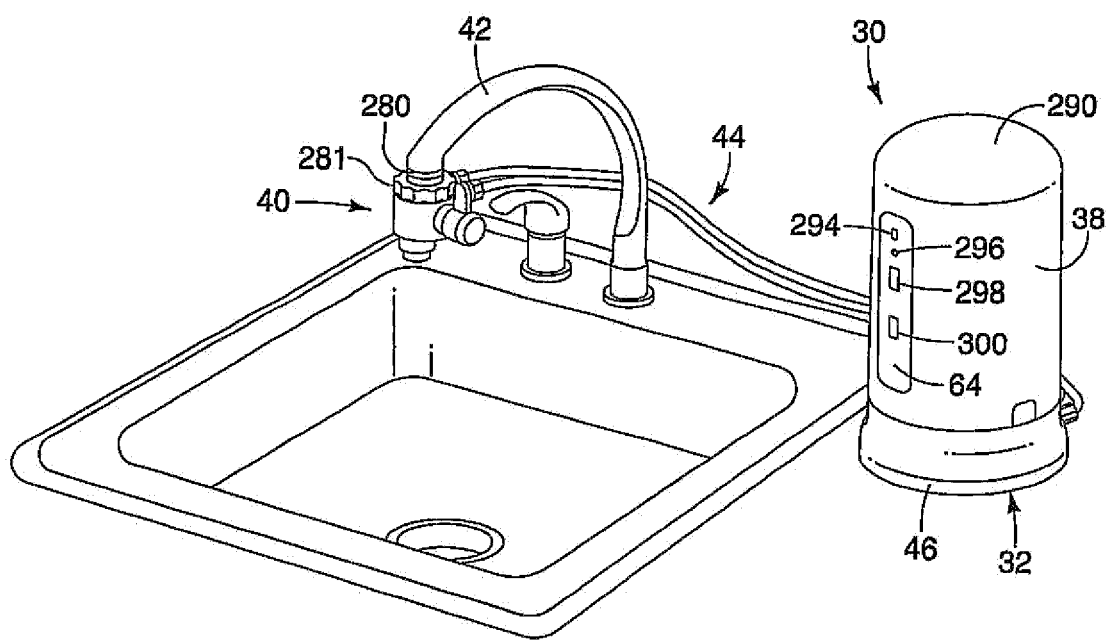
FIG. 1 is a perspective view of the present water filter system attached to a faucet.
Figure 2:
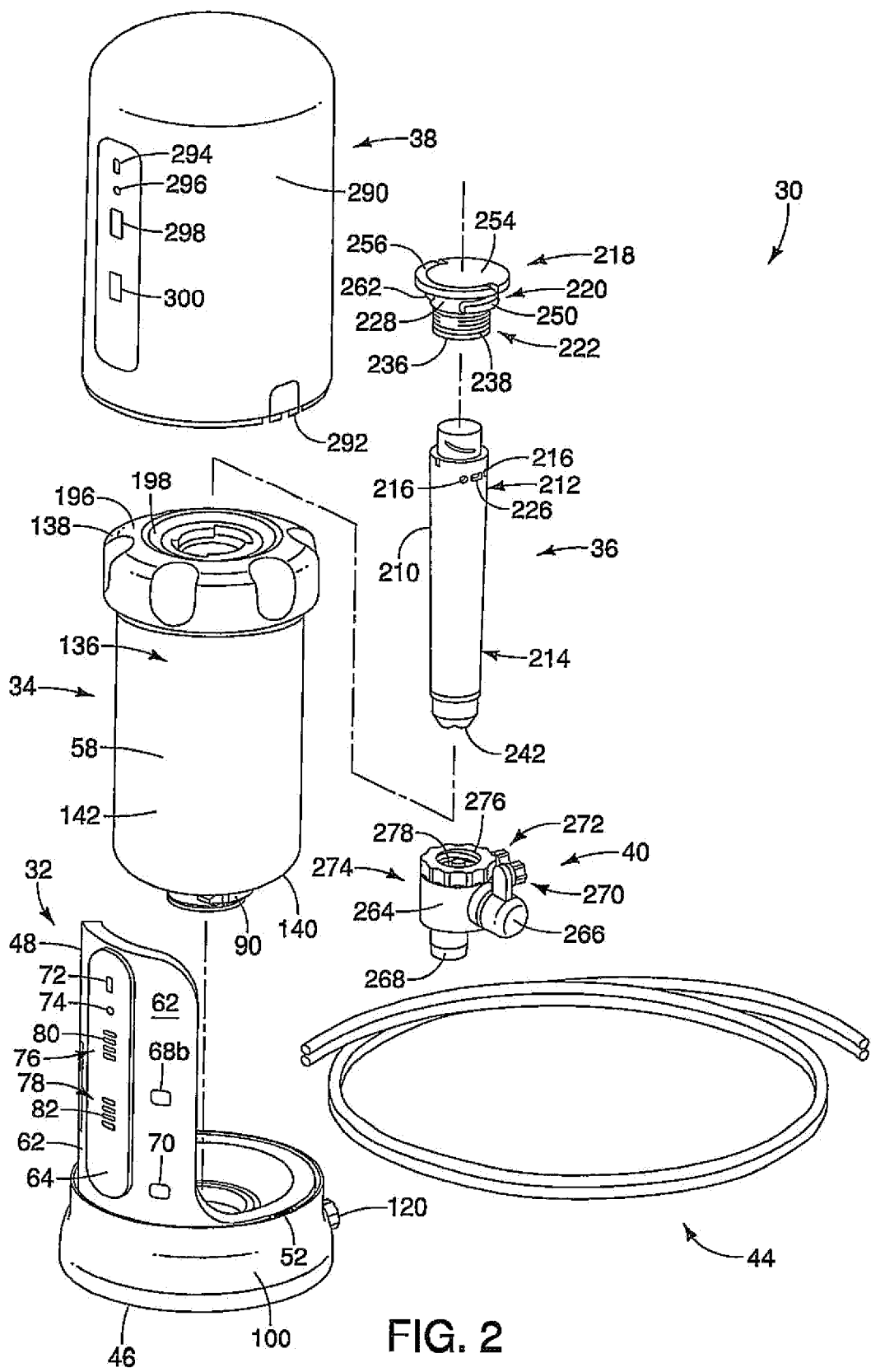
FIG. 2 is an exploded perspective view of the water filter system of FIG. 1.
Figure 3:
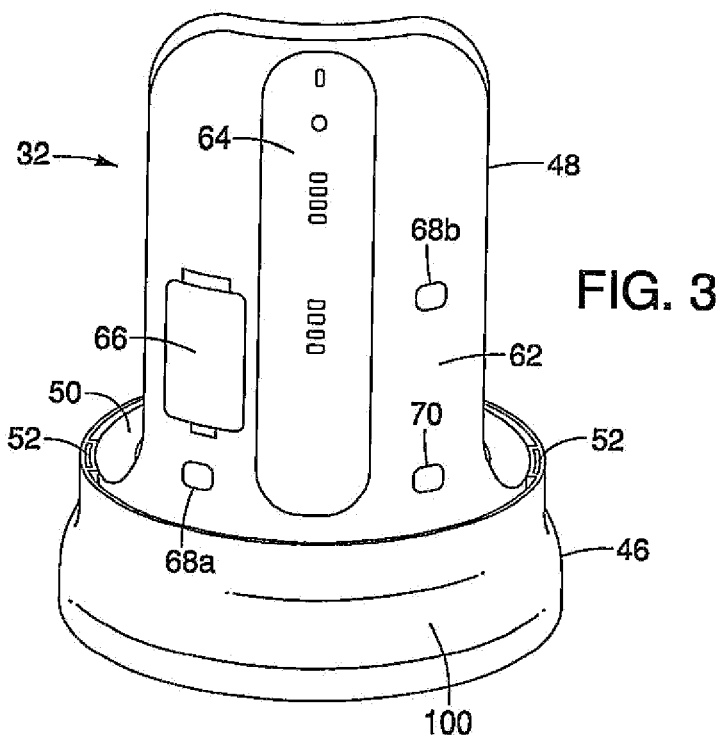
FIG. 3 is a front elevation view of the filter base shown in FIG. 2.

Referring now to FIGS. 1-2, a filter system, generally designated 30, is used in homes and businesses to filter water used for drinking, cooking and other functions in which clean water is desired. The present filter system 30 includes a filter base 32 placed on a countertop or similar surface, a removable filter cartridge 34 that is sits in the filter base and includes a removable enhancement cartridge 36, and a cover 38 that encloses the filter cartridge and engages the filter base. A diverter valve 40 attaches to a faucet 42 and diverts incoming water to the filter system 30 via suitable tubing 44 where the water is filtered and returned to the faucet for dispensing into a cup or other container.

Figure 4:
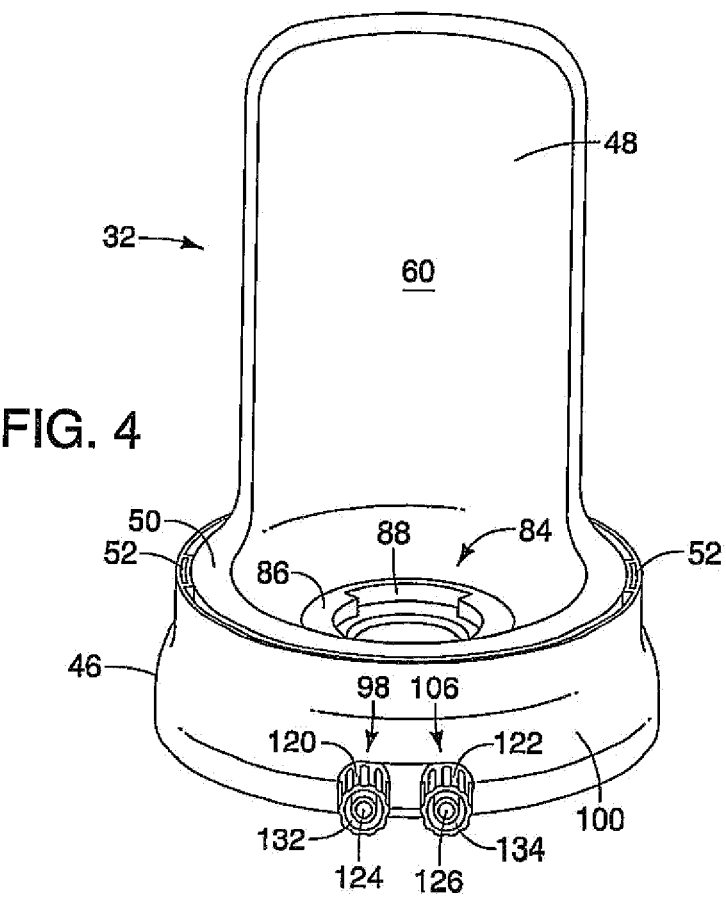
FIG. 4 is a rear elevation view of the filter base of FIG. 3.
Figure 5:
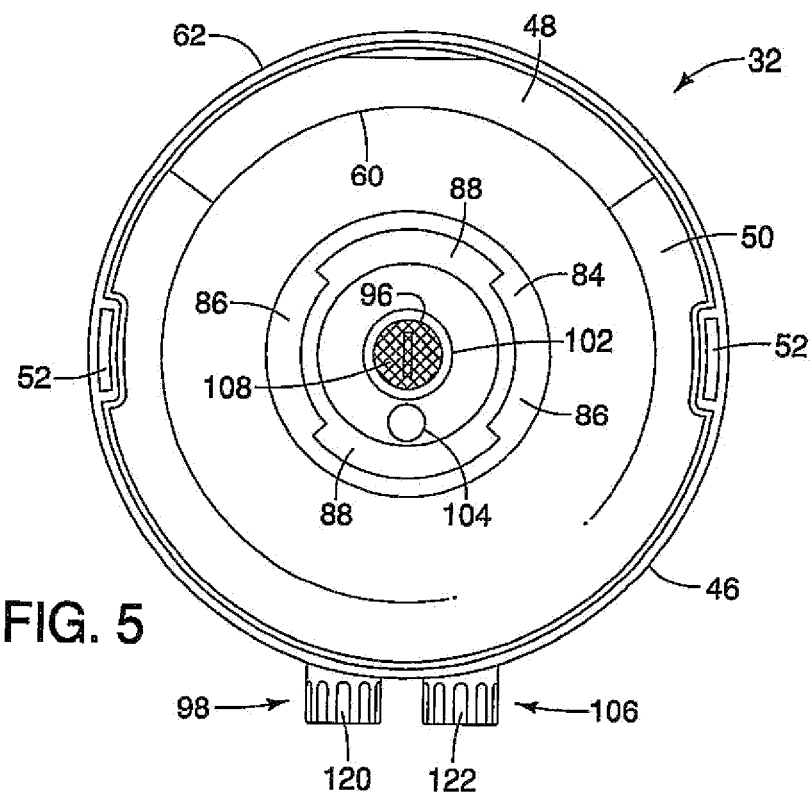
FIG. 5 is a top view of the filter base of FIG. 3.
Figure 6:
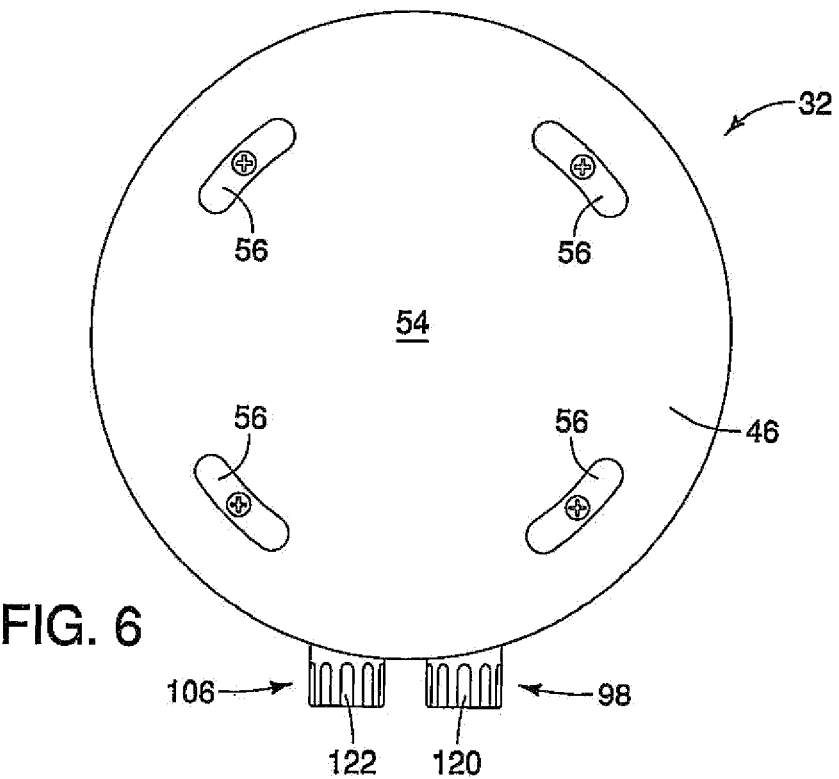
FIG. 6 is a bottom view of the filter base of FIG. 3.

Referring specifically to FIGS. 3-6, the filter base 32 includes a bottom support 46 having a generally circular cross-section and a curved vertical support 48 that transversely extends from the bottom support. The bottom support 46 has an upper surface 50 including opposing slots 52 for securing the cover 38 in position as described below. Also, a bottom surface 54 of the bottom support 46 includes a plurality of spaced feet 56 that are preferably made with a non-slip material such as rubber. The feet 56 prevent the filter base 32 from slipping or sliding on a counter or other underlying surface. As shown in FIGS. 2, 4 and 5, the vertical support 48 is curved inwardly or has a generally concave shape to correspond to an outwardly curved outer surface 58 of the filter cartridge 34. Thus, after the filter cartridge 34 is seated in the base 32, the outer surface 58 of the cartridge is directly adjacent to an inner surface 60 of the vertical support 48 to provide axial support to the filter cartridge. The opposing side or outer surface 62 of the vertical support 48 includes a visual light display 64, a battery housing 66, a pair of reset buttons 68a and 68b, and a de-activation actuator or button 70.

The visual light display 64 includes a series of visual indicators, preferably lights that are generally, vertically aligned. The top two lights 72 and 74 are single lights. Below these lights are two groups of lights 76 and 78 where each group includes four independent, generally oval-shaped lights 80 and 82. It is contemplated that the lights may have any suitable shape or configuration on the light display. Preferably, the lights 72, 74, 80 and 82 are each light emitting diodes (LEDs) but may be any suitable type of illuminating indicator. In the illustrated embodiment, each of the lights 72, 74, 80 and 82 illuminates or darkens independently of and sequentially relative to the other lights in the light display 64. For example, all of the lights in each of the groups of lights 76 and 78 start out being illuminated and then the topmost light in each of the groups darkens, followed by the light directly below the topmost light and so forth. Also, the lights may all be one color or a combination of colors depending on the application. Preferably, the lights are provided in distinguishable colors.

Power is provided to the lights 72, 74, 80 and 82 by batteries (not shown) stored in the battery housing 84. Alternatively, electrical power can be provided to the visual light display from an electrical outlet through a cord including electrical wiring connected to a plug.

First and second reset buttons 68a and 68b are respectively associated with the filter cartridge 34 and the enhancement cartridge 36. Each reset button 68a and 68b resets the time period for replacing the filter and enhancement media cartridges 34, 36. Thus, a user presses reset button 68a after replacing the filter cartridge 34, and presses reset button 68b after replacing the enhancement cartridge 36. Preferably, the first and second reset buttons 68a, 68b are spring-biased buttons as known in the art and are electrically connected by suitable wiring to the respective light groups 76, 78 on the light display 64.

The de-activation button 70 is also a spring-biased button that is configured to de-activate the first group of lights 76 associated with the enhancement cartridge 36. In some circumstances, the enhancement cartridge 36 is not needed such as when the incoming water already has sufficient minerals in it. A user can therefore remove the enhancement cartridge 36 from the filter cartridge 34 as described below so that additional minerals are not added to the filtered water. Pressing the de-activation button 70 disables or de-activates the lights in the first group of lights 76 so that the lights darken or go dark to indicate that the enhancement cartridge has been removed. As stated above, de-activation of the enhancement cartridge 36 is desirable when the water already has sufficient minerals in it or when certain users do not want one or more minerals in their water. It should be appreciated that the first and second reset buttons 68a, 68b and the de-activation button 70 may be any suitable actuators or buttons.

The bottom support 46 defines a generally circular receptacle 84 configured to receive the filter cartridge 34. The receptacle 84 is provided with a mounting ring by peripherally alternating bayonet-style tabs 86 and grooves 88 that engage corresponding tabs 90 and grooves 92 on a bottom surface 94 of the filter cartridge 34 to lock the filter cartridge to the filter base 32 in a push and twist motion as described below. A first opening 96 located in the center of the receptacle 84 is in fluid communication with an incoming water port 98 located on a peripheral surface 100 of the bottom support 46. An O-ring 102 is inserted in the first opening 96 to form a seal between the first opening and the filter cartridge 34. A second opening 104, which is adjacent to the first opening 96, is in fluid communication with an outgoing water port 106 on the peripheral surface 100 of the bottom support 46. Preferably, a screen 108 is positioned in the first opening 96 to remove any particles that may remain in the incoming water. A screen may also be positioned in the second opening 104 to further filter out any remaining particles and other matter in the outgoing water.

Figure 10:
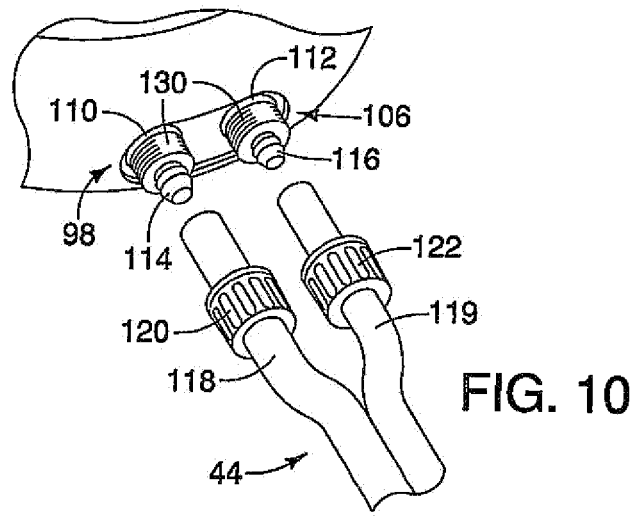
FIG. 10 is a fragmentary perspective view of the filter base showing the tubing being connected to the incoming and outgoing water ports of the filter base.
Figure 11:
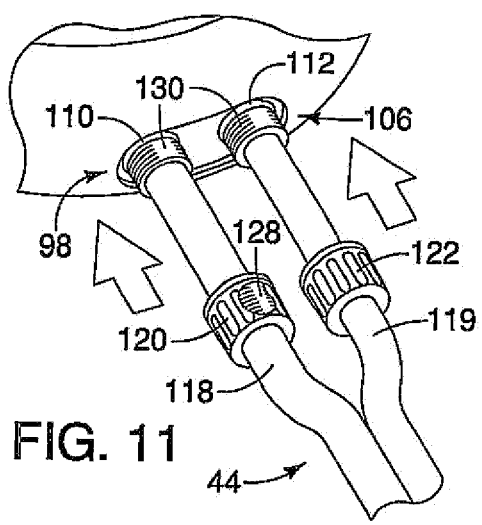
FIG. 11 is a fragmentary perspective view of the filter base showing the tubing connected to the incoming and outgoing water ports of the filter base.

As shown in FIGS. 10 and 11, the incoming and outgoing water ports 98, 106 each include threaded fittings 110, 112 having barbed nozzles 114, 116. The nozzle 114 for the incoming water port 98 has a diameter that is larger than a diameter of the nozzle 116 for the outgoing water port 106. By differentiating the diameters of the nozzles 114, 116 it is easier for a user to correctly connect the respective incoming and outgoing water tubes 118, 119 between the filter base 32 and the faucet 42. Two port caps 120, 122 (FIG. 4) having the same outer diameter each define through-holes 124, 126 and include internal threading 128 that respectively engages external threading 130 on each fitting 110, 112. The port cap 120 connected to the incoming water port 98 has an outer opening 132 (FIG. 4) with a diameter that is greater than a diameter of an outer opening 134 on the outgoing water port cap 122 to respectively receive ends of the incoming and outgoing water tubes 118, 119 connected to the faucet 42.

Figure 7:
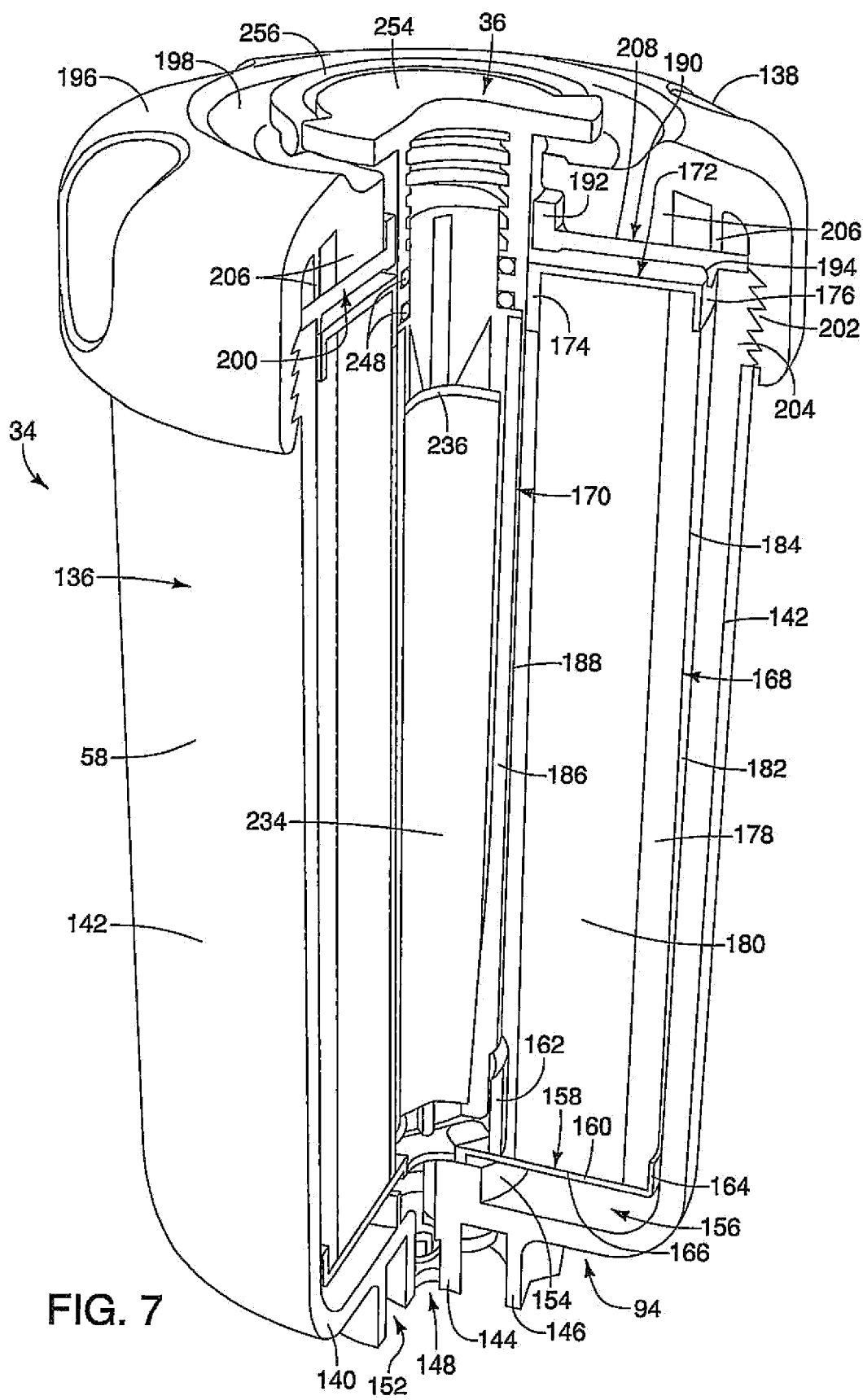
FIG. 7 is a fragmentary perspective view of the filter cartridge shown in FIG. 2.

Referring now to FIG. 7, the filter cartridge 34 includes a body 136 having a generally cylindrical shape and a cap 138 attached to the body. The body 136 includes a bottom wall 140 and a cylindrical wall 142 transversely extending from the bottom wall. Also, inner and outer annular flanges 144, 146 depend from the bottom wall 140. The inner flange 144 defines a generally circular inlet 148 for receiving incoming water from the faucet 42. A flow regulator is mounted inside the inlet to regulate the water flow into the filter cartridge. For example, a 0.9 gallon per minute (gpm) flow regulator 150 is optionally attached to the inlet to limit the flow of water through the cartridge 34. The outer flange 146 defines an annular outlet 152 disposed radially outwardly from the inlet 148. Filtered water flowing out of the filter cartridge 34 exits through the outlet 152 and then flows to the outgoing water port 106 (FIG. 4). To securely connect the filter cartridge 34 to the filter base 32, bayonet-style tabs 90 and grooves 92 (FIG. 8) extend laterally from the outer flange 146 and rotatably engage the corresponding tabs 86 and grooves 88 in the receptacle 84 of the filter base 32.

On the inside of the filter cartridge 34, a cylindrical, support ring 154 extends upwardly from the bottom wall 140 and defines an annular flow channel 156 between the ring and the outer cylindrical wall 142.

A lower tray 158 is attached to and extends radially from the ring 156. The lower tray 158 includes a bottom support wall 160 and radially spaced inner and outer walls 162, 164 extending upwardly from the bottom wall where the inner wall is taller than the outer wall. A portion of the bottom wall 160 extending between the inner and outer walls 162, 164 forms a bottom support 166 for a filter element 168 as described below.

The pre-formed annular filter element 168 is seated on the bottom support 166 between the inner and outer walls 162, 164. The filter element 168 has a generally cylindrical shape and defines a central, axially-extending chamber 170 configured for receiving the enhancement cartridge 36 as described below. An upper tray 172 is attached to the filter element 168 and includes inner and outer radially spaced, depending walls 174, 176 along opposing sides of the filter element. In the illustrated embodiment, the filter element 168 preferably includes a radially outer filter layer 178 and an inner filter layer 180. The outer filter layer 178 is made of a non-woven, nanoalumina filter which removes bacteria and viruses from the incoming water. One such filter is a Nanoceram® filter manufactured by Argonide Corporation. The inner filter layer 180 is a carbon block that removes particulates, heavy metals, organic chemicals, chlorine, and unpleasant tastes and odors from the water. It should be appreciated that any suitable filter material or combination of filter materials may be used for the outer and inner filter layers 178, 180. It should also be appreciated that the filter element 168 may include one or more filter layers for filtering the incoming water.

Incoming water flows through the annular flow channel 156 and upwardly through an outer filter channel 182 defined between an outer surface 184 of the filter element 168 and the outer wall 142. After the incoming water passes through the filter element 168, the filtered water enters an inner filter channel 186 defined between an inner surface 188 of the filter element 168 and the enhancement cartridge 36. The filtered water travels upwardly through the inner filter channel 186 toward the top of the filter cartridge 34.

To properly secure the filter element 168 in the body 136 of the filter cartridge 34, an annular support plate 190 is positioned on the upper tray 172. The support plate 190 is a separate component that is not attached to or integrally formed with any other component in the filter cartridge 34. As shown in FIG. 7, the support plate 190 includes an upwardly extending annular wall 192 at a first end and a downwardly extending annular lip 194 near an opposing, radially outwardly spaced second end. The wall 192 provides support to the upper portion of the enhancement media cartridge 36 and the annular lip 194 guides the filter element 168 into position within the body 136.

The cap 138 has an upper side 196 defining a circular, recessed area 198 and a lower side 200 forming an inner space. An inner diameter of the cap 138 is generally the same as an outer diameter of the body 136 such that threads 202 on an inner surface of the cap engage corresponding threads 204 on the outer surface of the body. The lower side 200 of the cap 138 includes at least one, and preferably two, downwardly extending arms 206 that exert pressure on an upper surface 208 of the support plate 190 as the cap 138 is threaded onto the body 136. During operation of the filter system 30, the pressure on the support plate 190 by the arms 206 secures the filter element 168 in position on the bottom support 166 of the lower tray 158.

Figure 8:
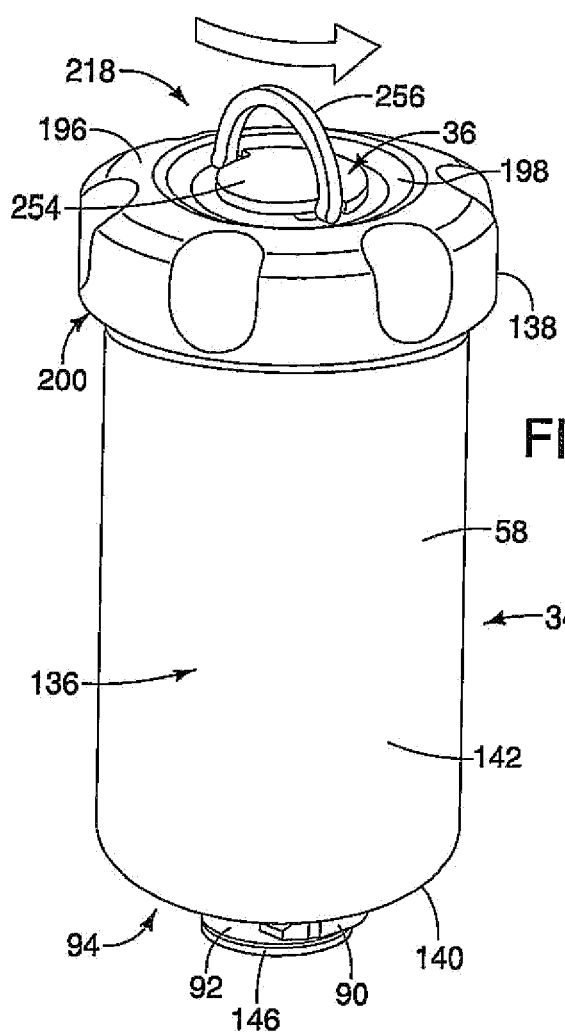
FIG. 8 is a fragmentary perspective view of the filter cartridge including the enhancement cartridge illustrating the direction of rotation for removing the enhancement cartridge from the filter cartridge.
Figure 9:
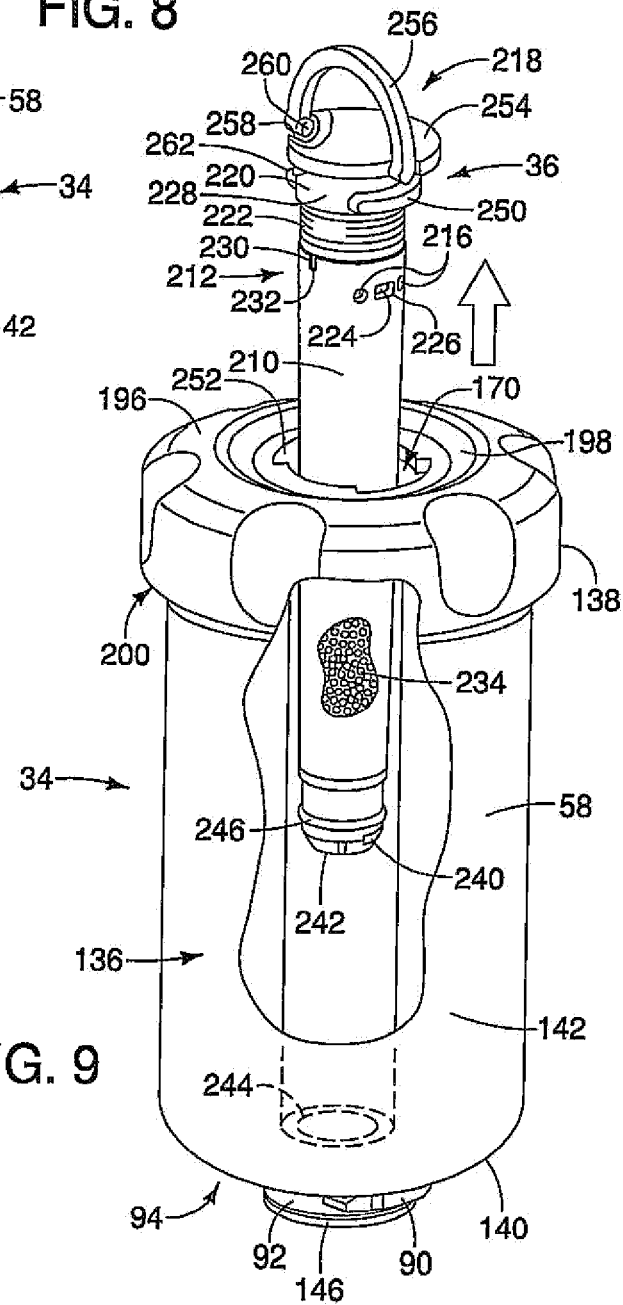
FIG. 9 is a fragmentary perspective view of the enhancement cartridge partially removed from the filter cartridge.

Referring now to FIGS. 8 and 9, the removable enhancement cartridge 36 is configured to fit within the central chamber 170 defined by the filter element 168. The enhancement cartridge 36 includes an elongated cylindrical housing 210 having an upper end 212 and a bottom end 214. The upper end 212 of the housing 210 defines a pair of through holes 216 which receive the filtered water from the inner filter channel 184. A handle member 218 is removably attached to the upper end 212 of the housing 210 and has a generally cylindrical base portion 220 and a connecting portion 222. The connection portion 222 connects to the upper end 212 of the housing 210 by suitable threading or any suitable connector or connection method. On opposing sides of the handle member 218 are biased tabs 224 that engage corresponding openings 226 on the housing 210 to secure the handle member 218 to the enhancement cartridge 36.

As shown in FIG. 9, a flange 228 transversely extends from the handle member 218 between the connecting portion 222 and the base portion 220. Opposing alignment tabs 230 (FIG. 9) extend downwardly from the flange 228 and engage corresponding grooves 232 on the housing 210 for aligning the handle member 218 upon connection with the housing. After assembly, the tabs 230 are seated within the corresponding grooves 232 on the housing 210 and fit within the corresponding tab openings 226. The tabs 230 are biased into the grooves 232 to secure the handle member 218 on the housing 210.

The interior of the enhancement cartridge 36 and, more specifically, the housing 210 has a hollow interior to hold the granular enhancement media material 234. It should be appreciated that any suitable enhancement media material may be filled or placed in the interior of the housing 210. The removable handle member 218 prevents the enhancement media material 234 from falling out of the top of the housing 210 during use. When the enhancement media material 234 is spent, the handle member 218 is removed and the spent enhancement media material is removed and replaced.

To prevent the enhancement media material 234 from clogging the through holes 216, a cylindrical plate-like filter 236 is placed in a recess 238 in the bottom of the handle member. Specifically, the filter 236 is positioned between the handle member 218 and the enhancement media material 234. The bottom end of the housing 210 includes a screen 240 that allows the filtered water to flow out of the enhancement cartridge 36 and prevents the enhancement media material 234 from entering the filter base 32. As shown in FIG. 9, the bottom of the enhancement cartridge 36 has a cross-shaped support 242 that engages a corresponding recess 244 in the bottom of the filter cartridge 34 to support the enhancement cartridge 36 within the filter cartridge. An O-ring 246 is attached to the bottom of the housing 210 to form a seal between the enhancement cartridge 36 and the filter cartridge 34 that prevents incoming water from moving upwardly through the central chamber 170 of the filter cartridge.

The housing 210 defines an interior receptacle having threads which engage threads (not shown) on the handle member. Also, a pair of spaced O-rings 248 are attached to the handle member 218 for forming a seal between the enhancement cartridge 36 and the upper end of the central chamber 170 of the filter cartridge 34. The O-rings 248 prevent filtered water from exiting through the top of the filter cartridge 34. A pair of opposing flange members 250 transversely extend from the handle member 218 and engage corresponding grooves 252 (FIG. 9) on the filter cartridge 34 for locking the enhancement cartridge 36 in place relative to the filter cartridge. A circular cover member 254 on the top of the handle member 218 has a diameter which is larger than a diameter of the lower portion of the handle member.

To aid in the installation or removal of the enhancement cartridge 36 from the filter cartridge 34, a generally D-shaped handle 256 is pivotally connected to the cover member 254. Specifically, the cover member 254 includes opposing recesses 258 which are engaged by pins 260 extending from the D-shaped handle 256. A stop 262 extends radially from an outer surface of the handle member 218 and prevents the handle 256 from moving downwardly past the cover member 254. As shown, the handle 256 is flush with the cover member 254 when it is in a storage position (FIG. 2) and extends generally transversely to the cover member 254 when it is in a use position (FIG. 9). In the use position, a user grabs the handle 256 and twists or rotates it relative to the filter cartridge 34 to remove and replace the enhancement cartridge 36. The handle 256 can then be moved to the storage position when not in use.

There are situations where the enhancement cartridge 36 is not needed or is not necessary such as when the incoming water already has sufficient minerals in it. In such a situation, a user removes the enhancement cartridge 36 from the filter cartridge 34 and then removes the handle member 218 from the housing 210. The handle member 218 is then re-inserted into the filter cartridge 34 and then turned to lock the handle member in place relative to the filter cartridge. This configuration allows filtered water to pass through the central chamber 170 without passing through the enhancement cartridge 36. The enhancement cartridge 36 can then be replaced when needed. Also, to indicate that the enhancement cartridge 36 has been removed from the filter cartridge 34, a user presses the de-activation button 70, which de-activates or darkens the first group of lights 76.

Referring now to FIGS. 1 and 10-13, the diverter valve 40 and the incoming and outgoing tubes 118, 119 are used to transfer incoming raw water to the filter system 30 and return filtered water to the faucet 42 to be dispensed to a user. The diverter valve 40 includes a generally cylindrical body 264 having a lever 266 that extends transversely from the body and a spigot 268 that extends downwardly from a bottom surface of the body. A pair of incoming and outgoing valve ports 270, 272 extend transversely from the body 264. An upper portion 274 of the body 264 includes a cylindrical extension 276 that has threads 278 for engaging threads 280 on an interior surface of a faucet connector 281. The diverter valve 40 may be a ball valve or any other suitable type of valve as known in the art. The lever 266 is moveable between a first position and a second position. In the first position, raw water from a household water supply is diverted to the filter system 30, filtered and returned to the faucet 42 where the filtered water exits through the spigot 268 into a glass or other container. When the lever 266 is moved to the second position, the diverter valve 40 blocks the outgoing port 272 connected to the filter system 30 and allows the incoming raw water to go directly to the spigot 268 and out into a container. The unfiltered water is typically used for cleaning or washing dishes.

Figure 12:
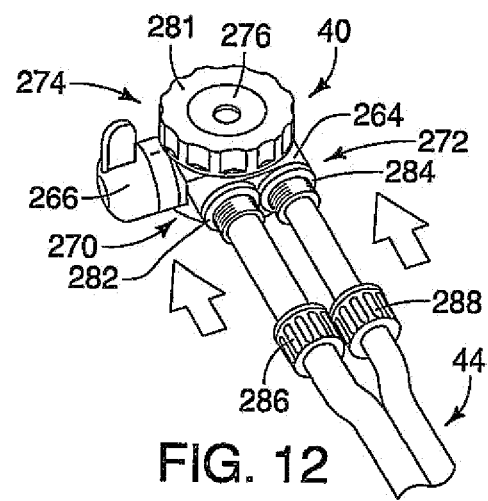
FIG. 12 is a fragmentary perspective view of the diverter valve showing the tubing being connected to the incoming and outgoing water ports of the diverter valve.
Figure 13:
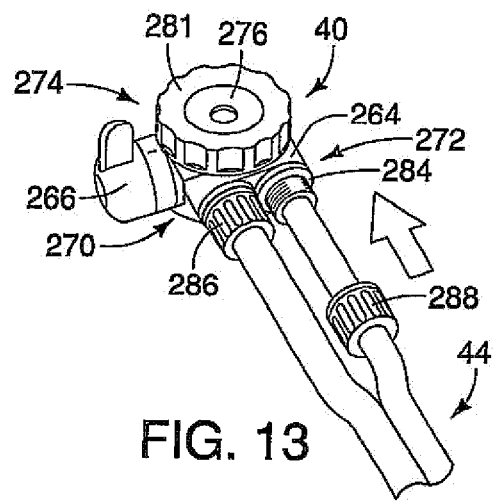
FIG. 13 is a fragmentary perspective view of the diverter valve showing the tubing connected to the incoming and outgoing water ports of the diverter valve.

Once mounted on the faucet 42, the tubing 44, and more specifically, the incoming water tube 118 and the outgoing water tube 119, are connected to the incoming and outgoing ports 270, 272 on the diverter valve 40. Specifically, the incoming water tube 270 has a larger diameter than the outgoing water tube 272 and therefore fits over larger nipple fitting 282 on the diverter valve 40. Similarly, the outgoing water tube 119 has a smaller diameter and therefore fits over the smaller nipple fitting 284 on the diverter valve 40. Threaded caps 286, 290, which are slid over the corresponding tubes as shown in FIGS. 12 and 13, are then moved into contact with the nipple fittings 282, 284 and are threaded onto the fittings to hold the tubes in place on the diverter valve 40. The opposing ends of the tubes are then secured to the ports 98, 106 on the bottom support 46 of the filter base 32. Specifically, the larger tube 118 fits onto the corresponding nipple 108 on the filter base 32 and the other tube 119 fits over the corresponding nipple 130 of the filter port 106. The caps 120, 122 are threadingly engaged with the ports to hold the tube ends in engagement with the filter base 32.

Referring now to FIGS. 1 and 2, the cover 38 is shown and includes a generally cylindrical hollow body 290 that fits over the filter cartridge 34 and engages the bottom support 46 of the filter base 32. Specifically, the bottom of the cover 38 includes downwardly depending securing tabs 292 (FIG. 2) that engage the slots 52 in the bottom support 46 to hold the cover in position on the filter base 32. As shown in FIG. 2, the cover 38 includes four windows 294, 296, 298 and 300 that align with the visual indicators on the filter base. The windows are made of a substantially translucent or translucent material to allow the lights to be seen through the windows by a user. The first, topmost window 294 aligns with light 72 and indicates the battery power level. Similarly, the second window 296 aligns with light 74 and indicates the flow level within the filter system, the third window 298 aligns with the first group of lights 76 and indicates the remaining capacity of the enhancement cartridge 36, and the fourth window 300 aligns with the second group of lights 78 and indicates the remaining filtering capacity of the filter cartridge 34.

In operation, when a user wants to dispense filtered water from the faucet 42, the user moves the lever 266 on the diverter valve 40 to the first position or the filter position. This diverts the raw water coming from the water supply through the faucet 42 and the filtered water tube 118 to the filter base 32. The water then moves through the incoming water port 98 and the inlet 148 of the filter cartridge 34. As shown in FIG. 7, the raw water enters the inlet 148 and passes through the flow regulator or flow controller 150. The flow controller 150 controls the flow rate of the incoming water through the filter cartridge 34. After leaving the flow controller 150, the water moves through the annular flow channel 156 and into the outer filter channel 182. The water moves upwardly within the channel 182 and then laterally through the filter element 168. As the water moves through the outer filter layer 178, bacteria and viruses from the water are removed. Also, when the water moves through the inner filter layer 180, it passes through the carbon block which removes particulates and other substances as described above.

The filtered water now moves upwardly through the inner filter channel 186 located between the enhancement cartridge 36 and the inner side of the filter element 168. The water flows upwardly until reaching the through holes 216 defined by the upper end 212 of the enhancement cartridge 36.

The water passes through the through holes 216 and then moves downwardly through the filter 236 and the enhancement material 234. As the water moves through the central chamber 170 of the filter cartridge 34, the enhancement media material 234 adds minerals to the filtered water such as calcium, magnesium and other desired minerals. The filtered water then exits through the outlet 152 at the bottom of the cartridge 34 and into the outgoing water port 106 of the filter base 32. The water then leaves the filter base 32 and travels through the filtered water tube or outgoing tube 119 to the diverter valve 40 which directs the water through the spigot 268 and out into a glass or other container for use.

To use unfiltered water for cleaning or washing dishes, the user simply rotates the lever 266 on the diverter valve 40 to the unfiltered water position. In this position, the diverter valve 40 blocks the outgoing filter port 272 so that the raw water moves directly to the spigot 268 and into the sink.

Over the course of time, the filter media material in the filter cartridge 34 loses capacity to filter the raw incoming water. Typically, under normal use, the filter media material will last for about one year. At this point, a user removes the filter cartridge 34 from the filter base 32 and presses the release button 70 on the filter base to unlock the filter cartridge. The user then rotates the filter cartridge 34 relative to the filter base 32 and lifts it off the filter base to be replaced. If the enhancement cartridge 36 also needs to be replaced, the filter cartridge 34 including the enhancement cartridge, is replaced as a unit with a new filter cartridge and new enhancement media cartridge. If the enhancement cartridge 36 does not need to be replaced, then the user simply twists and removes the enhancement cartridge from the filter cartridge 34 and inserts the enhancement cartridge into a new filter cartridge.

If only the enhancement cartridge 36 is spent or has lost capacity, the user removes this cartridge as described above (FIGS. 8 and 9) and rotates the enhancement cartridge to the release position. To do this, a user lifts the handle 256 on the handle member 218 and then twists the enhancement cartridge until it is in the release position. The user then lifts the enhancement cartridge 36 out of the filter cartridge 34 and replaces it with a new enhancement cartridge. To secure the new enhancement cartridge 36 in the filter cartridge 34, a user pushes the new enhancement cartridge down into the central chamber 170 of the filter cartridge 34 and then turns it to the locked position. The user replaces the cover 38 over the filter cartridge 34 and secures it to the filter base 32 as described above. The filter system 30 is now ready to be used again.

The present filter system 30 is convenient to use and easy to set up in any household or building because it sits on the top of counter and does not have to be mounted under the sink or any other place in the household. Furthermore, conventional filter systems have filter including filter media material and enhancement media material that are fixed within the filter housing. Therefore, the entire filter cartridge 34 must be replaced when one or both of the materials are spent. This increases the cost of the filter cartridges and the expense to the consumer. The present filter system 30 overcomes this problem by having an independently replaceable enhancement cartridge 36 that is removably secured to the filter cartridge 34 so that one or the other of the filter cartridges can be replaced thereby decreasing manufacturing expenses and costs to the consumer.

Referring now to FIGS. 14 to 24, another embodiment of the filter system is shown and generally designated as 300, where the filter system is used in homes and businesses to filter water used for drinking, cooking and other functions in which clean water is desired. The filter system 300 includes a filter base 302 placed on a countertop or similar surface, a removable filter cartridge 34, which is seated in the filter base, and includes a removable enhancement cartridge 36, and a cover 304 that encloses the filter cartridge 34 and engages the filter base 302. An inlet connector 306 and an outlet connector 308 are removably attached to an inlet port 310 and outlet port 312 (FIG. 18) on the filter base 302. A transfer assembly 314 including an inlet tube 316 and an outlet tube 318 is connected to the inlet connector 306 and the outlet connector 308 at one end and to a diverter valve 320 at an opposing end. In use, the diverter valve 320 diverts incoming water to the filter system 300 via suitable tubing where the water is filtered and returned to a faucet for dispensing into a cup or other container.

As shown in FIGS. 15 to 20, the filter base 302 includes a bottom support 322 having a generally circular cross-section and a vertical support 324 that transversely extends from the bottom support. The bottom support 322 has an upper surface 326 including opposing slots 328 for securing the cover 304 in position on the filter base. Also, a bottom surface 330 of the bottom support 322 includes a plurality of spaced support feet 332 that are removably secured to the filter base 302 by connectors 334, such as screws, where the feet are preferably made with a non-slip material such as rubber. In use, the feet 332 help to prevent the filter base 302 from slipping or sliding on a counter or other underlying surface.

In the illustrated embodiment, the vertical support 324 has a curved outer surface 336 that corresponds to the curved shape of the inner surface 338 of the cover 304. Also, an inner surface 340 of the vertical support 324 has a generally concave shape that corresponds to an outwardly curved outer surface 58 of the filter cartridge 34. Thus, after the filter cartridge 34 is seated in the filter base 302, the outer surface 58 of the filter cartridge is directly adjacent to an inner surface 340 of the vertical support 324 to provide support to the filter cartridge.

Figure 14:
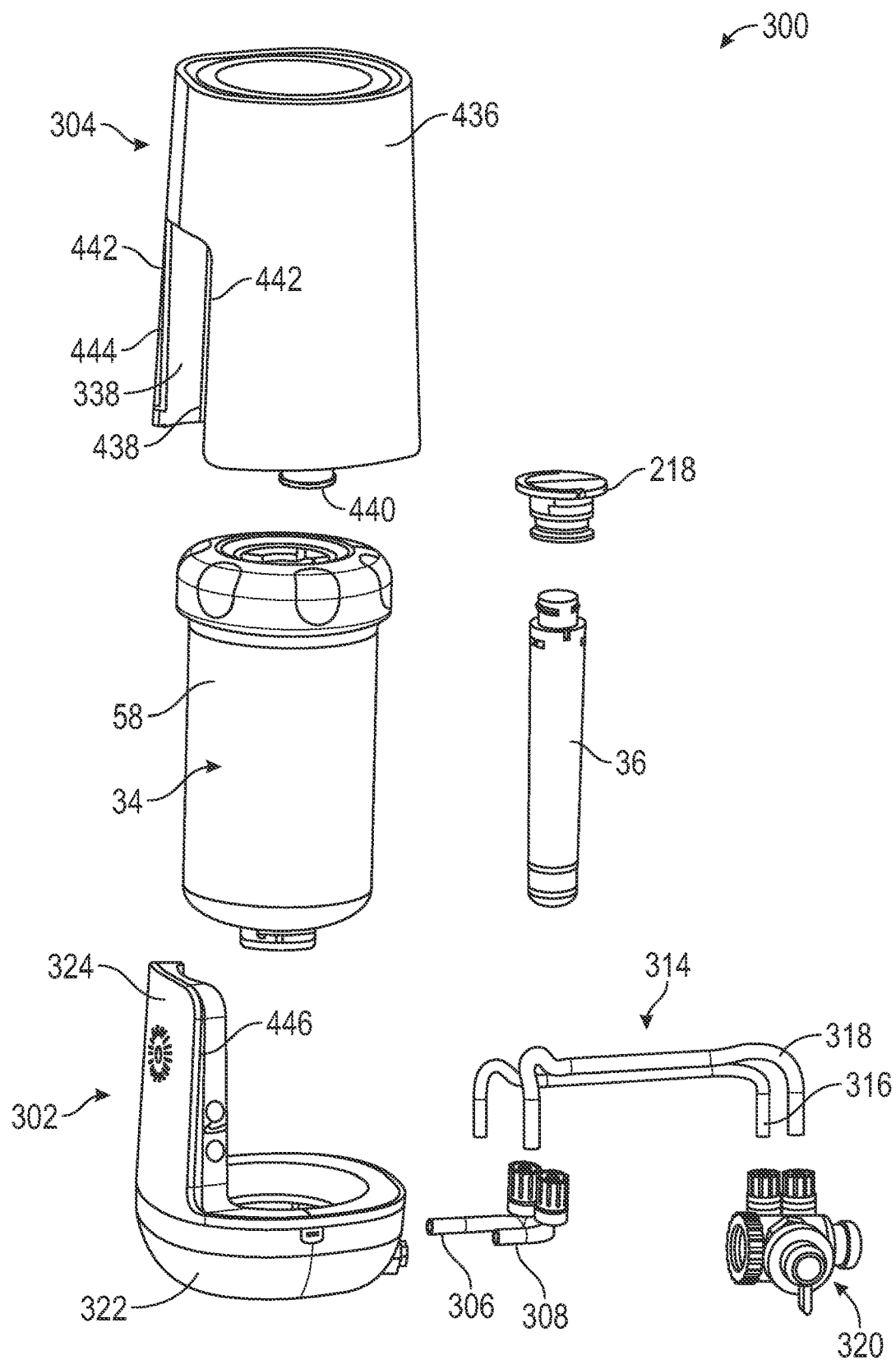
FIG. 14 is an exploded perspective view of another embodiment of the water filter system.
Figure 15:
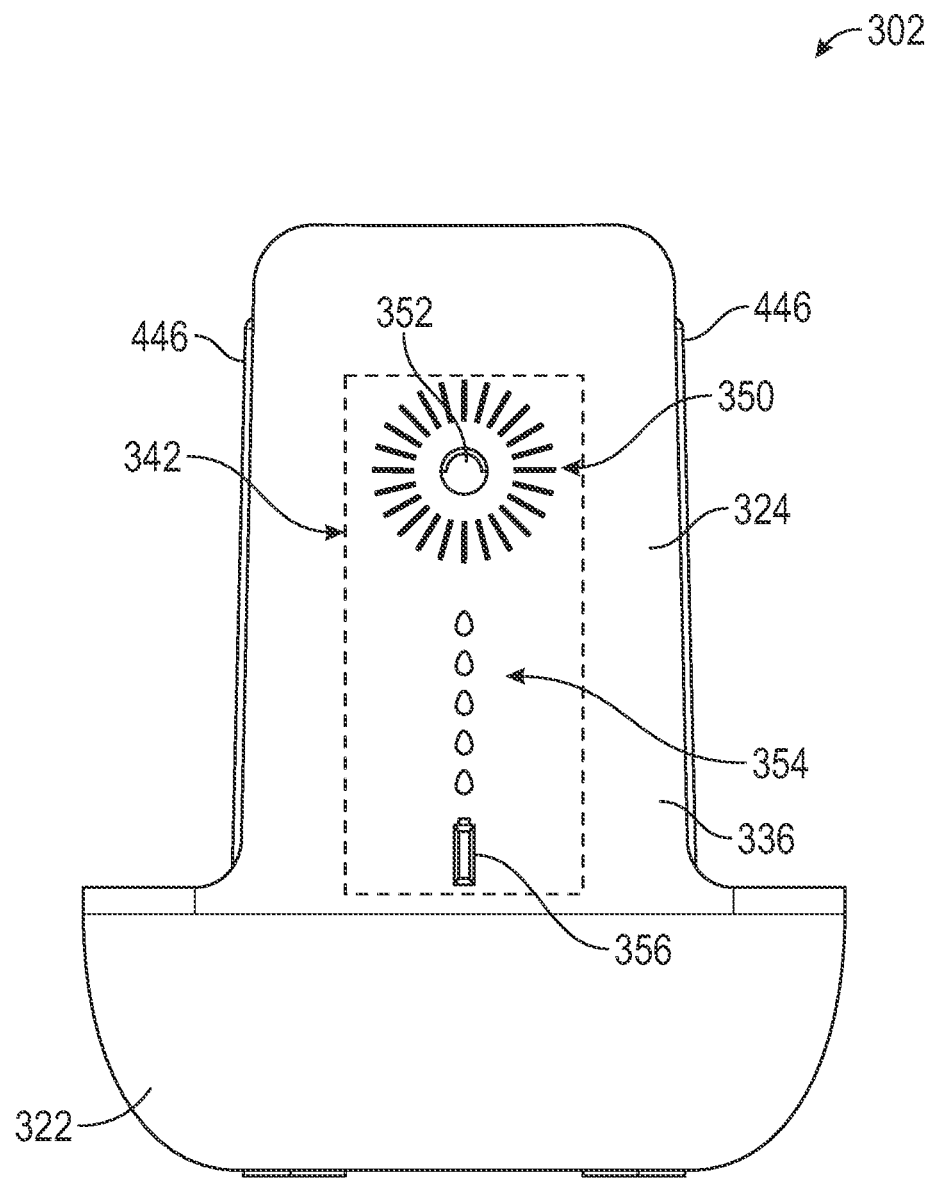
FIG. 15 is a front view of the filter base shown in FIG. 14.
Figure 16:
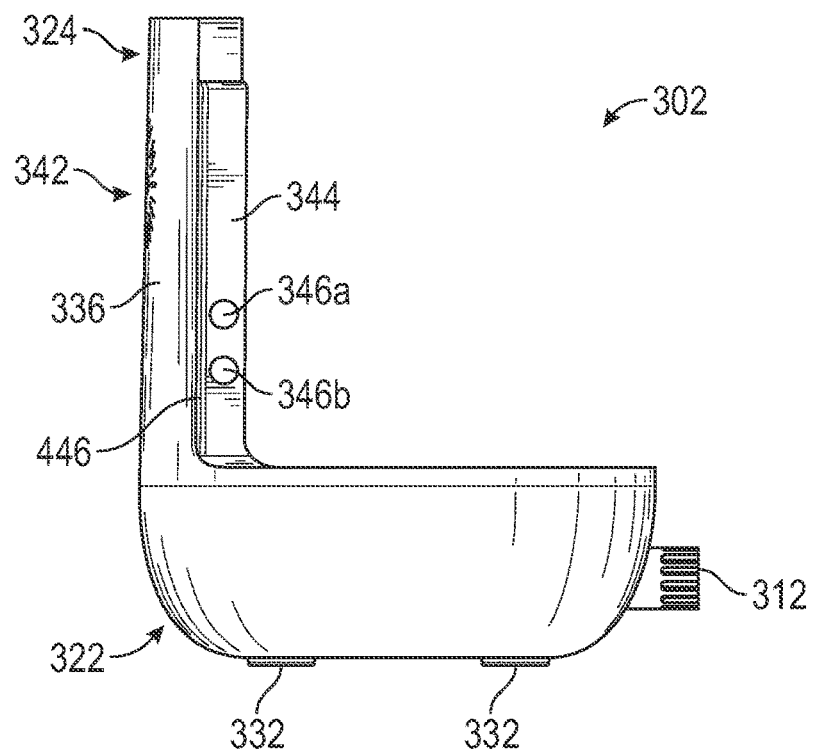
FIG. 16 is a left side view of the filter base.
Figure 17:
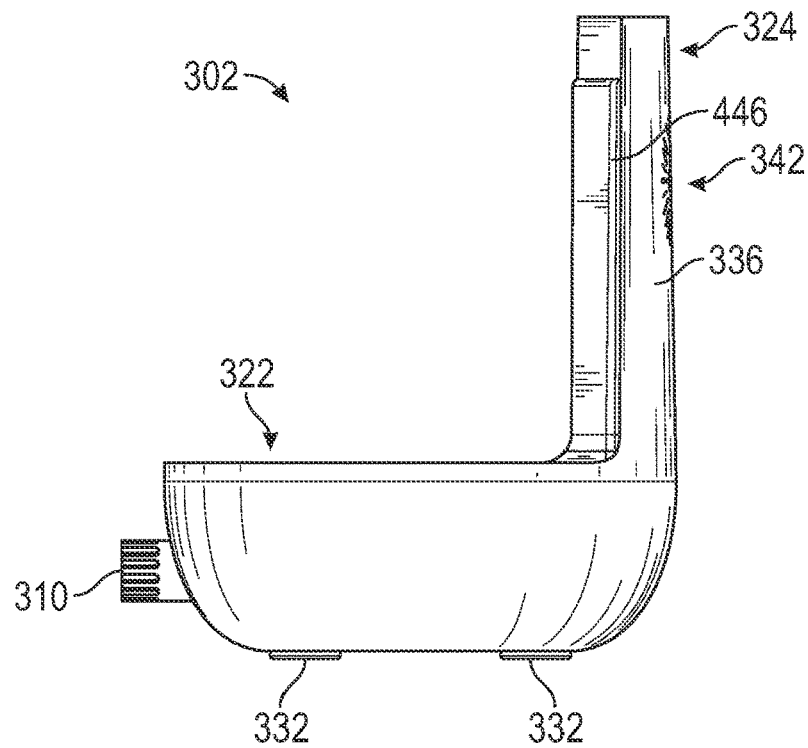
FIG. 17 is a right side view of the filter base.

Referring to FIGS. 14 and 15, the outer surface 336 of the vertical support 324 includes a visual light display 342 that indicates different parameters of the filter system 300 as described below. Also, a side surface 344 of the vertical support 324 includes control buttons 346a and 346b. Control button 346a is pressed by a user to activate or disable the enhancement cartridge 34. Both control buttons, i.e., control button 346a and control button 346b, are pressed simultaneously by a user to reset the capacity or lifespan level of the enhancement cartridge 34 and/or the filter cartridge 36 after the enhancement cartridge and/or the filter cartridge have been replaced. The visual light display 342 includes a series of visual indicators, preferably lights, that are on the front surface or outer surface 336 of the vertical support 324. A first set of the visual indicators 350 are arranged in a circular pattern about a central circular visual indicator 352. A second set of the visual indicators 354 are arranged in a vertically oriented line below the first set of visual indicators 350. As shown, a battery symbol 356 is positioned below the second set of visual indicators 354, which indicates the power remaining in the battery or batteries.

In this embodiment, the first set of visual indicators 350 are independent lights that are each positioned at an angle and are spaced from the central visual indicator 352, which is also a light. Similarly, the second set of visual indicators 354 are independent lights. It is contemplated that the lights may have any suitable shape or configuration on the visual light display 342. Preferably, the visual indicators or lights 350, 352 and 354 are each light emitting diodes (LEDs) but may be any suitable type of illuminating indicator.

In the illustrated embodiment, each of the lights 350, 352 and 354 illuminates or darkens independently of and sequentially relative to the other lights in the visual light display 342. For example, all of the lights in each of the first and second sets of visual indicators 350 and 354 start out being illuminated and then sequentially darken or shut off. It should be appreciated that the lights may all be one color, i.e., the same color, or a combination of different colors depending on the application. Preferably, the lights are provided in distinguishable colors. In the illustrated embodiment, the central visual indicator or light 352 indicates the capacity or lifespan of the enhancement media in the enhancement cartridge 36. Similarly, the first set of visual indicators or lights 350 surrounding the central visual indicator 352 indicate the filter capacity, i.e., the remaining capacity of the filter media to effectively filter impurities from the incoming water, of the filter media in the filter cartridge 34. Additionally, the vertically oriented visual indicators or lights 354 indicate the water flow through the filter cartridge 34 including the enhancement cartridge 36, where all of the lights are illuminated when there is maximum water flow and darkened or off when there is low or no water flow. It should be appreciated that the filter base 302 may include any suitable visual indicators to indicate different operational parameters of the filter system.

The vertical support 324 of the filter base 302 further includes a control device 358, such as a circuit board, that is in communication with the visual light display 342 and at least one sensor associated with at least one of the inlet port 330 and the outlet port 332 to monitor the amount of water flowing into or out of the filter base 302 and/or an amount of time that the filter system 300 is in operation. A memory device 360 is also mounted in the vertical support 324 of the filter base 302 and in communication with the control device 358 where the memory device is configured to store filter system parameters and operational parameters. In the illustrated embodiment, the control device 358 has a wireless communication device 362 that communicates with one or more stationary devices, such as a desktop computer, or one or more mobile devices, such as a cellular telephone, a tablet device, laptop computer or similar mobile device, via a wireless signal. The control device 358 enables a user to be able to remotely set and control operational parameters of the filter system 300 and monitor the function of the filter system. The filter base 302 preferably has a removable access cover 364 on the inner surface 340 of the vertical support 324 that enables a user to access the control device 358 and a battery or batteries in the filter base 302.

Power is provided to the visual indicators or lights 350, 352 and 354 and the control device 358 by either replaceable or rechargeable batteries (not shown) inside the vertical support 324 of the filter base 302. Alternatively, electrical power is provided to the visual light display 342 and the control device 358 from an electrical outlet via a cord including electrical wiring connected to a plug where the filter base 302 is directly powered by the electricity from the electrical outlet or powered by one or more internal rechargeable batteries that are charged by the electricity from the outlet.

In this embodiment, the bottom support 322 of the filter base 302 defines a generally circular receptacle 366 configured to receive the filter cartridge 34. The receptacle 366 is provided with a mounting ring by peripherally alternating bayonet-style tabs 368 and grooves 370 that engage corresponding tabs 90 and grooves 92 on a bottom surface 94 of the filter cartridge 34 to lock the filter cartridge to the filter base 302 in a push and twist motion as described below. A first opening 372 located in the center of the receptacle 366 is in fluid communication with an incoming water port 310 located in the bottom support 322. A seal element 376, such as an O-ring, is inserted in the first opening 372 to form a seal between the first opening and the filter cartridge 34. A second opening 378, which is adjacent to the first opening 372, is in fluid communication with an outgoing water port 312 in the bottom support 322. Preferably, a screen 382 is positioned in the first opening 372 to remove any particles that may remain in the incoming water. A screen may also be positioned in the second opening 378 to further filter out any remaining particles and other matter in the outgoing water.

Figure 18:
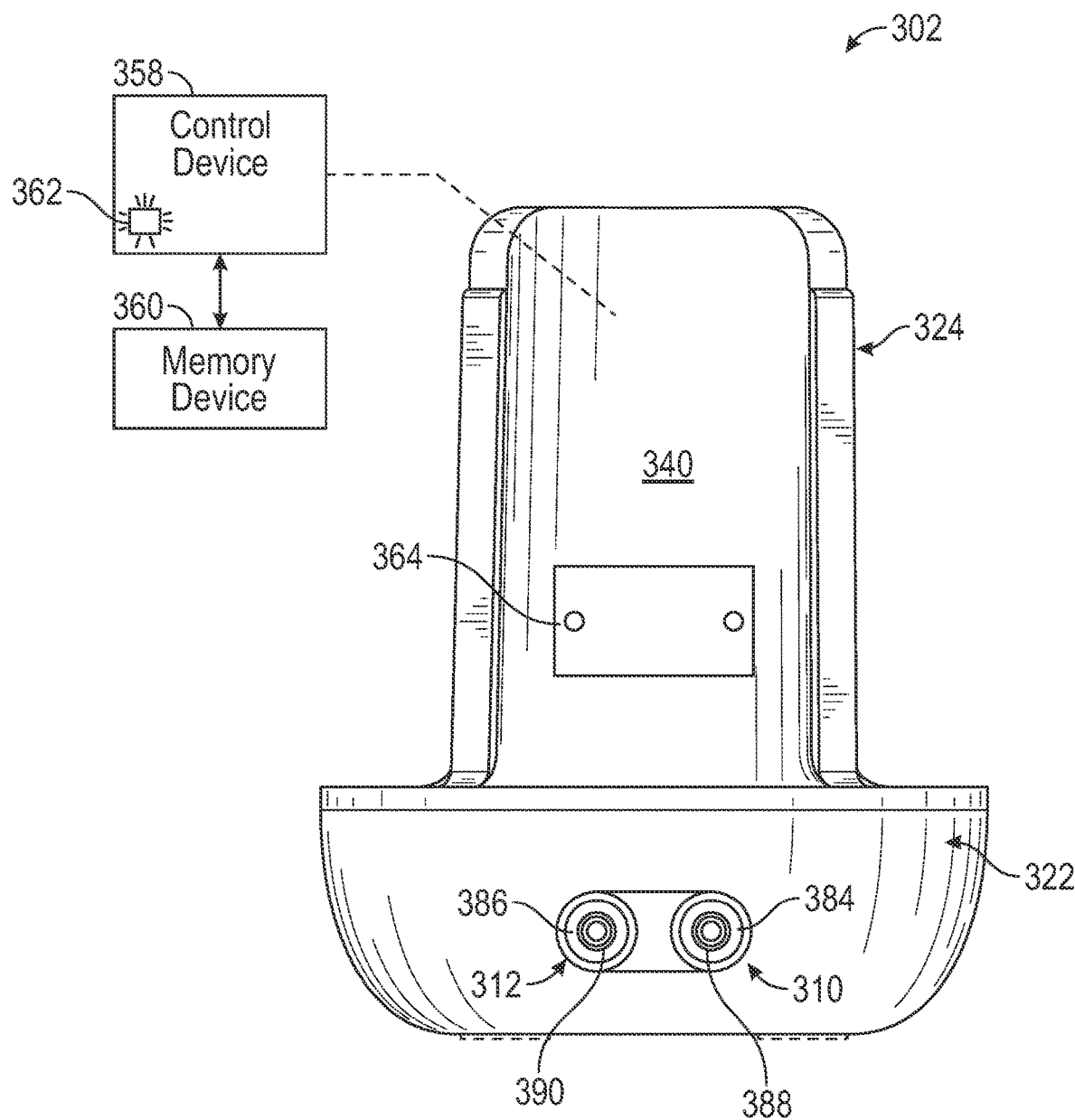
FIG. 18 is a rear perspective view of the filter base.
Figure 19:
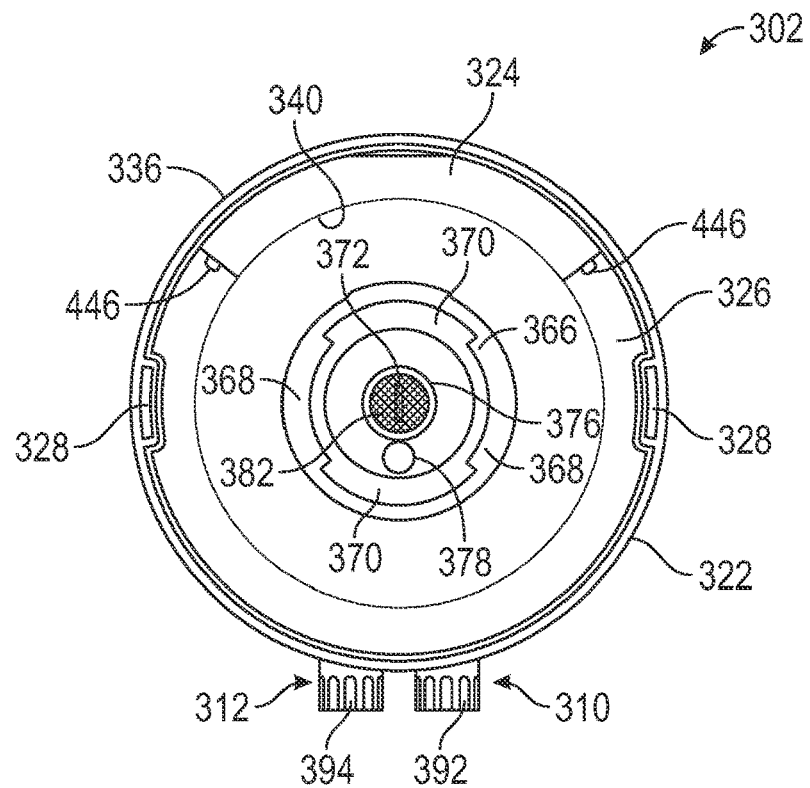
FIG. 19 is a top view of the filter base.
Figure 20:
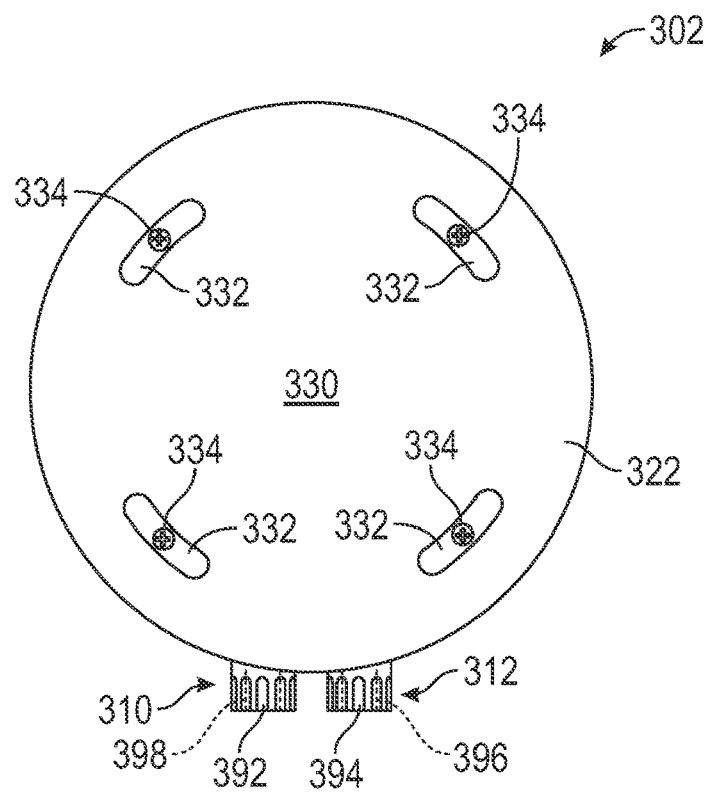
FIG. 20 is a bottom view of the filter base.
Figure 21:
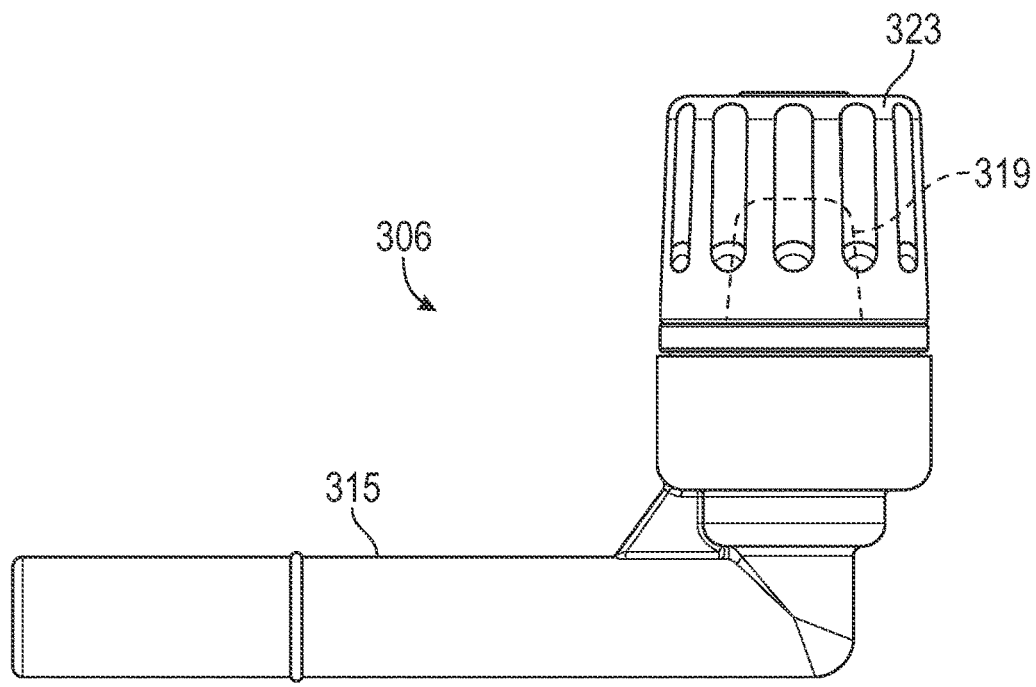
FIG. 21 is a side view of the inlet tube shown in FIG. 14.
Figure 22:
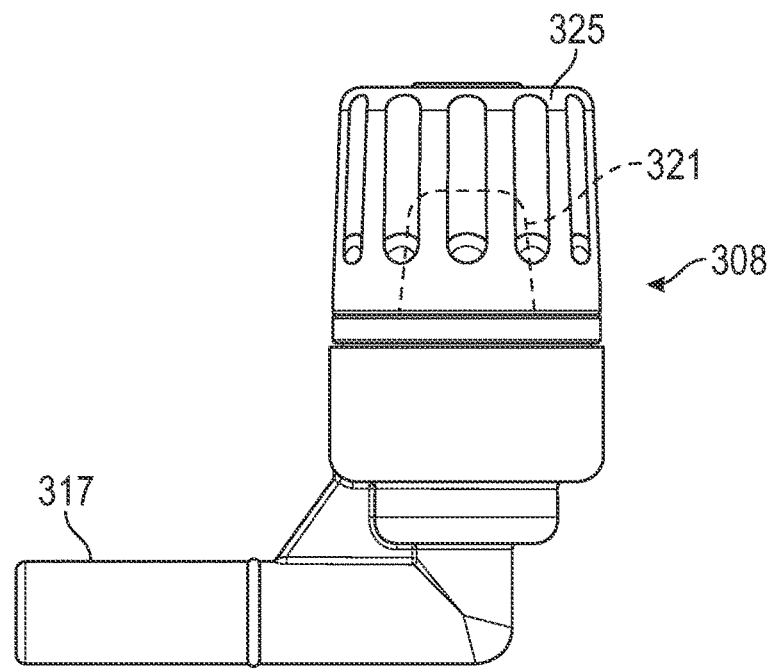
FIG. 22 is a side view of the outlet tube shown in FIG. 14.
Figure 23:
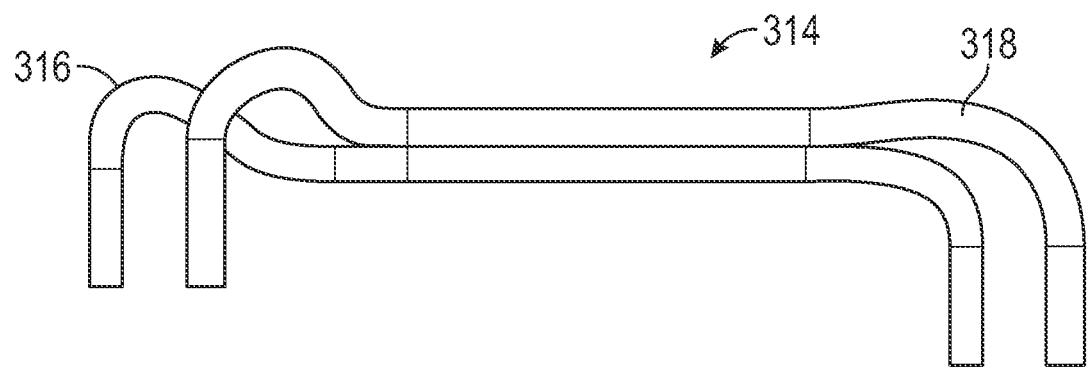
FIG. 23 is a perspective view of the inlet and outlet connector tube assembly shown in FIG. 14.

As shown in FIGS. 10, 11 and 18, the inlet and outlet ports 310, 312 each include threaded fittings 384, 386 with external threads (similar to the threaded fittings 110, 112 shown in FIGS. 10 and 11) having barbed nozzles 388, 390 similar to the barbed nozzles 114, 116. The nozzle for the inlet port 310 has a diameter that is larger than a diameter of the nozzle for the outlet port 312. By differentiating the diameters of the inlet and outlet nozzles it is easier for a user to correctly connect the respective inlet and outlet connectors 306, 308 to the filter base 302. Two port caps 392, 394 having the same outer diameter each define through-holes 396, 398 (FIG. 20) and include internal threading that respectively engages external threading on each fitting 384, 386. The port cap 392 connected to the inlet port 310 has an outer opening with a diameter that is greater than a diameter of an outer opening on the outgoing water port cap 394 to respectively receive ends of the inlet and outlet connectors as described below.

Referring now to FIG. 14, the filter cartridge 34 and the enhancement cartridge are the same as the filter cartridge and enhancement cartridge shown in FIGS. 1-9. Thus, the components and function of the filter cartridge and the enhancement cartridge are described above and the reference numbers associated with the components are repeated in FIGS. 14-23.

In the filtering process, the diverter valve 320, the transfer assembly 314 and the inlet connector 306 and the outlet connector 308 are used to transfer incoming raw water to the filter system 300 and return filtered water to the faucet 42 to be dispensed to a user.

Figure 24:
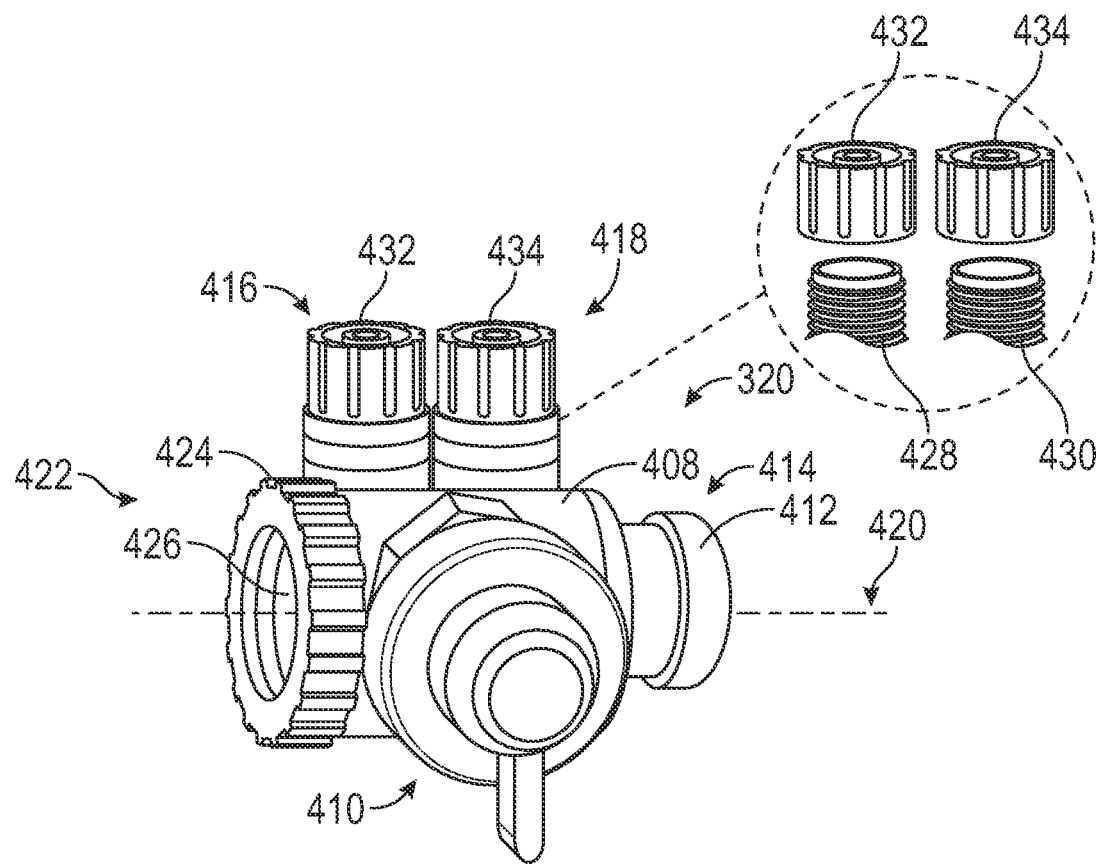
FIG. 24 is a perspective view of the diverter valve shown in FIG. 14.

As shown in FIGS. 14 and 24 the diverter valve 320 includes a generally cylindrical body 408 having a moveable lever 410 that extends transversely from the body. A spigot 412 extends outwardly from a first end 414 of the body 408 and a pair of incoming and outgoing valve ports 416, 418 extend from the body 408 and are oriented to be transverse to a longitudinal axis 420 of the body. A second end 422 of the body 408 includes a cylindrical extension 424 that has threads 426 for engaging threads on an interior surface of a faucet connector or a tube extending from the faucet connector. The diverter valve 320 may be a ball valve or any other suitable type of valve as known in the art. The lever 410 is moveable between a first position and a second position. In the first position, raw water from a household water supply is diverted to the filter system 300, filtered and returned to the faucet 42 where the filtered water exits through a port at a back end of spigot 412 and into a glass or other container. When the lever 410 is moved to the second position, the diverter valve 320 blocks the outgoing port 418 connected to the filter system 300 and allows the incoming raw water to bypass the filter system and exit the diverter valve 320. The unfiltered water is typically used for cleaning or washing dishes.

Once mounted on the faucet 42, the transfer assembly 314, and more specifically, the inlet tube 316 and the outlet tube 318, are connected to the incoming and outgoing ports 416 and 418 on the diverter valve 320. Specifically, the inlet tube 316 has a larger diameter than the outlet tube 318 and therefore fits over larger nipple fitting 428 on the diverter valve 320. Similarly, the outlet tube 318 has a smaller diameter and therefore fits over the smaller nipple fitting 430 on the diverter valve 320. Threaded caps 432, 434, which are slid over the ends of the outlet tube 318 and the inlet tube 316, are then moved into contact with the nipple fittings 428, 430 and are threaded onto the fittings to hold the tubes in place on the diverter valve 320. The opposing ends of the inlet and outlet tubes 316, 318 of the transfer assembly 314 are then secured to the inlet and outlet connectors 306, 308 which are secured to the ports 310, 312 on the bottom support 322 of the filter base 302. Specifically, the larger tube 315 fits into the corresponding nozzle 388 on the filter base 302 and the outlet tube 317 fits over the corresponding nozzle 390 of the filter base 302. The caps 392 and 394 are threadingly engaged with the ports to hold the inlet and outlet connectors 306, 308 in engagement with the filter base 302. Similarly, the opposing ends of the inlet and outlet connectors 306, 308 each include nipples 319, 321 and caps 323, 325 that threadingly secure the ends of the inlet and outlet connectors to the ends of the inlet and outlet tubes 316, 318 as described above.

Referring now to FIG. 14, the cover 304 is shown and includes a generally cylindrical hollow body 436 with an opening 438 on a front side, where the cover fits over the filter cartridge 34 and engages the bottom support 322 of the filter base 302. Specifically, the bottom of the cover 304 includes downwardly depending securing tabs 440 (FIG. 14) that engage the slots 328 in the bottom support 322 to hold the cover in position on the filter base 302. As shown in FIG. 14, the front side of the cover 304 includes the rectangular shaped opening 438 that has a size and shape that corresponds to the size and shape of the vertical support 324 of the filter base 302. The inside edges 442 of the cover 304 on opposing sides of the opening 438 each include a groove 444 that engages a protruding member 446 extending along opposing lateral sides of the vertical support 324. The engagement of the grooves 444 with the corresponding protruding members 446 on the vertical support 324 help to guide the cover 304 as it slides onto the filter base 302 until the bottom of the cover engages the filter base. The water is then passed through the filter cartridge as described above to filter the incoming water.

To use unfiltered water for cleaning or washing dishes, the user simply rotates the lever 410 on the diverter valve 320 to the unfiltered water position. In this position, the diverter valve 320 blocks the outgoing filter port 418 so that the raw water moves directly to the spigot 412 and into the sink.

While a particular embodiment of the present filter system has been described herein, it will be appreciated by those skilled in the art that changes and modifications may be made thereto without departing from the invention in its broader aspects and as set forth in the following claims.

The invention claimed is:

1. A water filter system comprising:
a base configured for receiving water from a faucet, said base including a bottom support and a vertical support transversely extending from said bottom support, wherein said vertical support includes a visual light display including visual indicators that indicate different parameters of the filter system;
a filter cartridge seated in said base, said filter cartridge defining a first chamber having at least one filter element, and a second chamber in fluid communication with said first chamber;
an enhancement cartridge removably inserted in said second chamber and including an enhancement material for adding minerals to the water, said enhancement cartridge being removable from said system separate from said filter cartridge; and
a cover having an unobstructed opening, wherein said cover is configured to slidingly engage said vertical support of said base so that when the cover is secured to the base, the visual light display on the base is positioned within said opening of said cover so that all of the visual indicators of the visual light display on said base are exposed and directly accessible through said opening in said cover.

2. The water filter system of claim 1, wherein said at least one filter element includes an outer filter layer and an inner filter layer.

3. The water filter system of claim 2, wherein said outer filter layer includes a non-woven, nanoalumina filter and said inner filter layer includes a carbon block.

4. The water filter system of claim 1, wherein said enhancement cartridge includes a housing and a handle member connected to said housing, said handle member including a handle that pivots between a storage position and a use position for facilitating removal of said enhancement cartridge from said filter cartridge.

5. The water filter system of claim 1, wherein said cover includes at least one tab configured to engage at least one groove on said base.

6. The water filter system of claim 1 further comprising a diverter valve connected to the faucet, said diverter valve including a body, a lever rotatably connected to said body and a spigot, an incoming port and an outgoing port, said lever being movable between a first position where the water is directed to said base and a second position where the water is directed out of said spigot.

7. The water filter system of claim 1, wherein said base includes a receptacle having a first opening in fluid communication with said incoming water port and a second opening in fluid communication with said outgoing water port, said filter cartridge being configured to engage said receptacle.

8. The water filter system of claim 1, said visual light display includes a plurality of visual indicators for indicating at least one of battery power and capacity of the enhancement material and capacity of the filter material.

9. The water filter system of claim 1, said visual light display includes a plurality of first visual indicators for indicating a capacity of the enhancement material and a capacity of the filter material and a plurality of second visual indicators for indicating at least one of battery power.

10. The water filter system of claim 1, further comprising a control device and a wireless communication device configured to remotely communicate with a remote mobile device or a remote stationary device.

11. The water filter system of claim 1, wherein said cover includes opposing grooves and said vertical support includes opposing protruding members, and wherein said grooves slidingly engage said protruding members of said vertical support when said cover is attached to said base.

\* \* \* \* \*